United States Patent
Bergman

(10) Patent No.: US 6,558,589 B1
(45) Date of Patent: May 6, 2003

(54) METHOD AND A DEVICE FOR MOLDING OBJECTS

(75) Inventor: Carl Bergman, Surahammar (SE)

(73) Assignee: Flow Holdings GmbH (SAGL) Limited Liability Company (CH)

( * ) Notice: Subject to any disclaimer, the term of this patent is extended or adjusted under 35 U.S.C. 154(b) by 0 days.

(21) Appl. No.: 09/529,094

(22) PCT Filed: Oct. 8, 1998

(86) PCT No.: PCT/SE98/01812

§ 371 (c)(1),
(2), (4) Date: Jul. 10, 2000

(87) PCT Pub. No.: WO99/19099

PCT Pub. Date: Apr. 22, 1999

(Under 37 CFR 1.47)

(30) Foreign Application Priority Data

Oct. 13, 1997 (SE) ................................................ 9703709

(51) Int. Cl.[7] .......................... B29C 45/77; B22D 17/00
(52) U.S. Cl. .................. 264/40.5; 164/113; 164/154.8; 164/303; 164/457; 264/328.1; 425/149; 425/405.2; 425/595
(58) Field of Search ............................. 264/40.5, 328.1; 425/595, 149, 405.1, 405.2; 164/119, 113, 457, 154.8, 303

(56) References Cited

U.S. PATENT DOCUMENTS 4,726,414 A * 2/1988 Merrien ....................... 164/119

FOREIGN PATENT DOCUMENTS

| EP | 0 354 017 | 2/1990 |
| SE | 435 243 | 9/1984 |
| SU | 1079353 | 3/1984 |

* cited by examiner

Primary Examiner—James P. Mackey
(74) Attorney, Agent, or Firm—Seed Intellectual Property Law Group LLC

(57) ABSTRACT

A device for molding objects includes a mold having a molding space enclosed therein and adapted to be filled by a fluid mold material intended to solidify therein. The fluid mold material is injected under pressure into the molding space and solidifies under this high pressure. A chamber receives the mold and is filled with a medium. The medium filling the chamber and surrounding the mold is pressurized. The pressurized medium acts upon the mold from all directions with at least the same pressure magnitude as the pressure of the mold material within the mold. Therefore, the mold is isostatically balanced by the forces acting upon the mold by the mold material and the medium.

20 Claims, 1 Drawing Sheet

METHOD AND A DEVICE FOR MOLDING OBJECTS

BACKGROUND OF THE INVENTION

1. Field of the Invention

Figure 1:
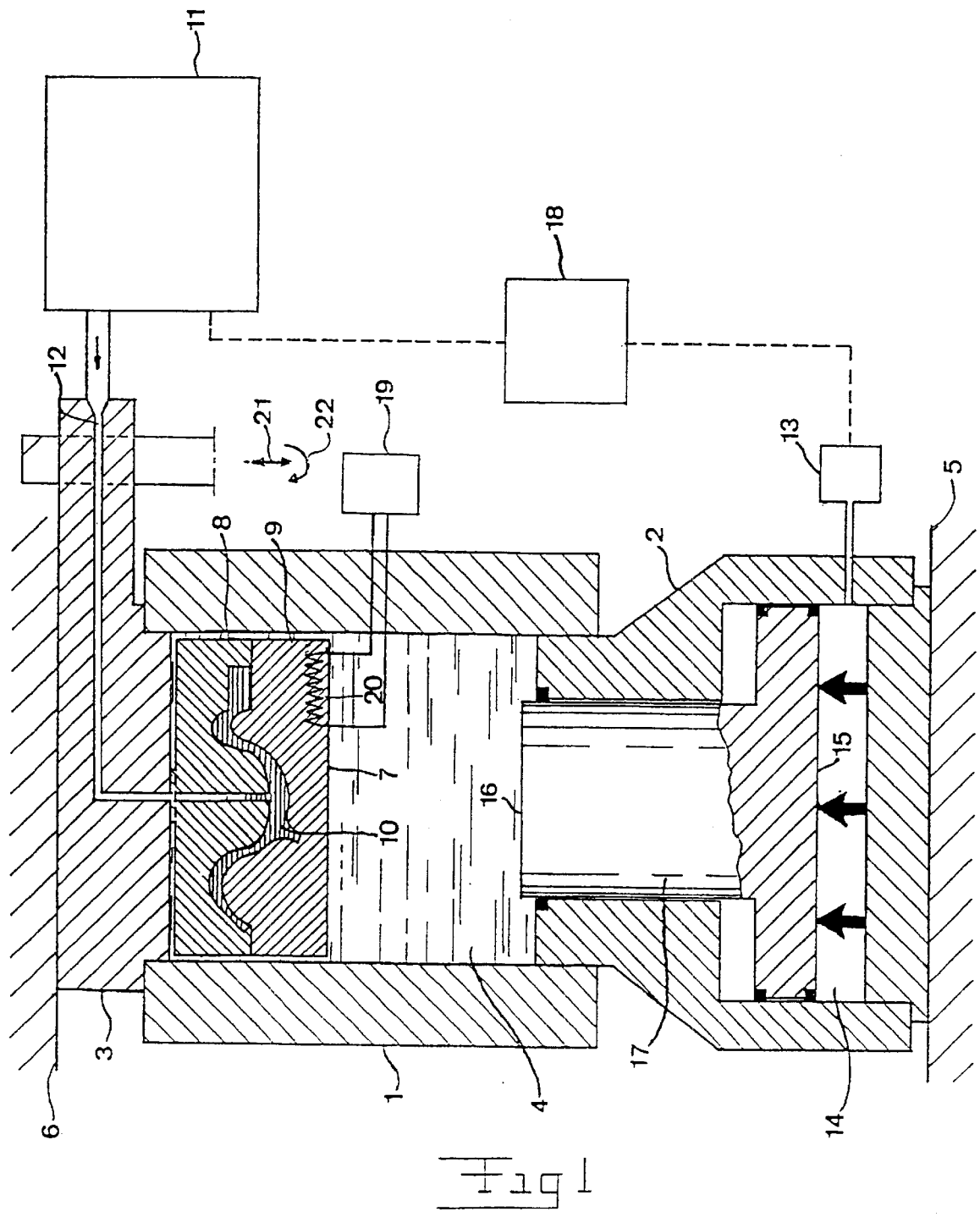

The present invention relates to a device for molding objects, which comprises a mold having a molding space enclosed therein and adapted to be filled by a fluid mold material intended to solidify therein.

2. Description of the Related Art

It is known that it is possible to obtain objects having considerably improved physical properties if the objects are produced by molding and the mold material is allowed to solidify from a molten state under a high pressure. This is, for example, the case in molding objects of different plastics, such as polyethylene, in which the improved physical properties are then obtained by the fact that the high pressure to which the molten plastic is exposed straightens the molecular chains, so that the solidified plastic gets stronger. When molding or casting metals while exposing the molten metal or the metal alloy to high pressures, so-called "shrinkages" in the casting may be pressed out, which substantially increases the strength and the life of the molded object.

It should be noted that the phrase "fluid mold material" used herein is to be given a very broad sense and comprises very thin fluid as well as more viscous, paste-like material.

Typical pressures for molding of this type are 5,000 bars or higher, but this information is not at all to be interpreted as limiting the invention. It is, in practice, nearly impossible to construct a mold for molding a complex object, which can withstand pressures of 5,000 bars or higher for many molding cycles. Therefore, it has been necessary to accept unreasonably high costs should a molding take place under the conditions mentioned above, such that a process for manufacturing the objects in question has not been commercially interesting, particularly when it is desired to produce the same detail a multiple number of times.

BRIEF SUMMARY OF THE INVENTION

The object of the present invention is to provide a device and a method to remedy the inconveniences mentioned above. The invention makes it possible to mold objects while the mold material solidifies under a high pressure in a way that is economically attractive while maintaining molded objects of high quality.

In one embodiment of the present invention such a device is provided, having a chamber adapted to receive the mold during the molding process. The invention also provides a pressure generating means adapted to generate a high pressure such that the pressure exerted on the molding material during the molding is at least the same magnitude as the pressure of the medium filling the chamber. The pressure in the mold and the pressure in the chamber isostatically balances the mold through the molding material and the forces acting upon the medium.

The invention also discloses a method for molding objects in which a fluid mold material under pressure is injected by a supply means to the molding space of a mold and is kept under pressure until the mold material solidifies.

By isostatically balancing the mold, the material of the mold does not have to be particularly resilient even if relatively complex details are molded. The isostatic balancing ensures that the mold may withstand pressures during the solidification of the mold material from a molten state for numerous cycles. Thus, it will be possible to produce molded objects having very good strength properties in comparatively large series without destroying the mold itself.

According to a preferred embodiment of the invention, the device comprises members adapted to register the pressure in the molding space of the mold during the molding, and control the pressure generating means to adjust the pressure of the medium in the chamber depending upon the pressure in the molding space of the mold. In this way, the pressure of the medium in the chamber is always such that the mold is continuously, substantially isostatically balanced independent of pressure changes to which the mold material is subjected in the mold when it solidifies from the molten state.

According to another embodiment of the invention, the mold is formed by a plurality of separable parts, and the pressure generating means is adapted to pressurize the medium in the chamber to a pressure which is slightly higher than the pressure of the molding material in the molding space during the molding, so as to support a sticking of the parts of the mold to each other during the molding. By choosing a somewhat higher pressure of the medium than the pressure to which the mold material is exposed in the mold the medium may in this way be utilized so as to reliably keep the parts of the mold together during the molding process.

According to another embodiment of the invention, a supply means is adapted to supply plastic material in a molten state under high pressure to the molding space. This is particularly advantageous, because molding plastic objects while utilizing the high pressure results in a straightening of the molecular chains within the plastic before solidification occurs. Thus, the result is a substantial improvement in the physical properties of the molded plastic compared with the solidification of such a plastic with no straightening of the molecular chains.

According to another embodiment of the invention, the supply means are adapted to feed the mold material into the molding space of the mold under a pressure exceeding 5,000 bars. Mold material exposed to pressure exceeding 5,000 bars, during the solidification from a molten state exhibits very good physical properties.

According to another embodiment of the invention, the supply means are adapted to feed a metal or metal alloy in its molten state to the molding space of the mold under a high pressure for molding an object. A molding of objects of metal or metal alloys while pressing so-called "shrinkages" out from the casting for obtaining high resistant objects is made possible by this invention.

According to another preferred embodiment of the invention the device comprises an arrangement adapted to control the temperature of the mold material supplied under high pressure to the molding space of the mold as a function of the time the mold material has been located in the molding space. Adapting the very solidification process to the material used, and to the pressures it is exposed to, enables the physical properties of the casting to be optimized.

In a further development of the previous embodiment, the heating arrangement has means for directly or indirectly heating the mold to prolong the time the mold material is present in the molding space before the molding thereof to the object takes place. This may be of a particular advantage should for example a plastic material having molecular chains requiring a comparatively long time for being straightened out be used as mold material. If no such prolongation is necessary for some materials, the heating will then be omitted.

BRIEF DESCRIPTION OF THE SEVERAL VIEWS OF THE DRAWING(S)

FIG. 1 is a simplified, partly sectioned view of the device for molding objects.

DETAILED DESCRIPTION OF THE INVENTION

A device for molding objects is illustrated in FIG. 1. The device has a pressure chamber 4 sealingly delimited by lateral walls 1, which may form a cylindrical or other arbitrary shape, as well as lower 2 and upper 3 lids. The two lids are kept in place through lower and upper press tables indicated at 5 and 6, respectively. A press frame, not shown, resists the pressure acting upon the press tables and keeps the lids in place. The press frame usually has a powerful reinforcement by many windings of music wires under a high pretension. Furthermore, the device comprises a mold 7, formed by two, mutually separable parts 8 and 9. The mold 7 may be one single part or more than two parts. Within the mold is a molding space 10 enclosed therein, which has the shape of the object to be molded.

The device is also provided with supply means 11, adapted to supply the mold material under a high pressure, with respect to atmospheric pressure, to the molding space 10. In one embodiment, the supply means has an injector with the ability to spray the mold material in liquid state under a pressure of about 6,000 bars into the molding space 10 and keep the mold material under this pressure until it has solidified. The mold material is supplied from the injector 11 through channel 12 and into the mold 7.

Polyethylene, in its molten state, may be supplied to the mold in this way. The advantage of supplying the polyethylene with this high pressure and letting it solidify from molten state under such a pressure, is that molecule chains forming it may be straightened out with comparatively improved physical properties as a consequence. However, this high pressure means, in the normal case, unreasonably high stresses are placed upon the mold, since the mold material will try to press the two parts 8, 9 of the mold apart, so that such a mold normally may not manage more than a few molding cycles before it has to be thrown away as a consequence of defects thereof. The affect of the stresses on the mold is particularly acute when molding details are more complex.

The foregoing problem is solved by the present invention by ensuring that the mold 7 is isostatically balanced during the molding process by filling the chamber 4 with a given medium, such as a fluid or oil. The fluid within the chamber 4 under pressure influences the mold from all directions and has at least the same magnitude as the pressure to which the mold material is exposed to during the molding. The mold 7 is arranged in the pressure chamber 4 such that the medium is able to surround and act upon the mold from all directions. The mold may be arranged to bear against the upper lid 3, such as shown in FIG. 1, but the surfaces of the upper lid 3, the mold, or both, must be roughened to ensure that the medium reaches between upper lid 3 and the mold 7.

In an alternative embodiment, rubber or any other elastomeric material is arranged as the medium at least closest to the mold with a fluid medium, such as oil, filling out the rest of the chamber. The mold in this embodiment is kept dry and is easier and nicer to handle when taken out of the chamber.

More particularly, the device has a pressure generating means for generating a required pressure inside the chamber 4. The pressure generating means comprises a member 13 adapted to supply the fluid medium under high pressure to a closed region 14. The pressurized medium within the closed region influences a large surface 15 of a piston 17 projecting into the chamber 4 with a smaller opposite surface 16 for obtaining a power amplification. The piston 17 may, in this way, be brought to move into chamber 4, thereby reducing the volume thereof and increasing the pressure of the medium located therein.

The device also comprises a monitoring means 18 adapted to register the pressure by which the supply means 11 supplies the mold material to the molding space 10. Based on this pressure information, the monitoring means controls the pressure generating means 13 to adjust the pressure of the medium in the chamber 4 depending upon the pressure in the molding space of the mold. The monitoring means ensures that the pressure in the chamber 4 is adapted to the pressure prevailing for the moment in the molding space 10 to achieve the desired isostatic balancing of the mold. However, it may also be desirable to have a somewhat higher pressure inside the chamber 4 relative to the pressure in the mold so as to generate forces that contribute to the unity of the mold.

The device is also provided with an arrangement 19 adapted to control the temperature of the mold, as a function of the time the mold material has been present in the molding space. The arrangement has, for this sake, means 20 schematically indicated for heating. Heating the mold and thereby the mold material in this way prolongs the staying time of the mold material in the molding space before solidification occurs. It will in this way be possible to ensure that, should this be desired, it takes a comparatively long time before the temperature of the mold material sinks that much that the solidification starts, in the case that the material has such a nature that it takes a comparatively long time for molecule chains included therein to be straightened out to a satisfying extent.

Upon completion of the molding process, the mold 7 may be "demolded" by lifting and pivoting the upper lid 3 up and away as indicated by the arrows 21 and 22.

The isostatic balancing of the mold during the molding of objects under a high pressure, according to the embodied invention, makes it possible to mold complex details using simple, low-cost molds. Additionally, the structural material used to make the mold itself does not have to be particularly strong, and nevertheless will last for many molding cycles.

Objects made from all types of materials may be molded by the present invention. However, the device is very well suited for molding details of plastic material and metals and metal alloys, especially details made from aluminum. One example of an aluminum-molded detail is a turbine blade for an aircraft, where the physical properties of the turbine blades must withstand high operating cycles and stress demands.

The invention is of course not in any way restricted to the preferred embodiments described above, but many possibilities to modifications thereof would be apparent to a man skilled in the art without departing from the basic idea of the invention as defined in the claims.

For example, it is possible that the magnitude of the pressures used differs from those described above. Notwithstanding, the invention is particularly well suited for pressures exceeding 2,000 bars and preferably, 5,000 bars.

The heating of the mold could take place in another way, for example, by arranging heating elements in the chamber or inside or outside the walls 1 restricting it.

The monitoring means of the pressure of the mold material in the mold could take place directly at the very supply means, such as shown in the drawing, but it would of course also be possible to arrange a pressure sensor at another location closer to the mold.

The described arrangement of means adapted to register the pressure in the molding space of the mold during the molding and control the means to adjust the pressure of the medium in the chamber depending upon the pressure in the molding space of the mold should be given a very general meaning, and includes the case in which the members supplying the mold material to the mold under a high pressure and generating the high pressure of the mold surrounding the medium are formed by one single pressure source in common, such as an hydraulic source, which may be connected to a separate pressure multiplicator for the molding material and the medium. The pressure of the medium may in this way be adapted to that of the mold material.

The pressure multiplicator for the medium could very well, contrary to what has been shown in the figure, be located outside the very "press frame".

What is claimed is:

1. A method for molding objects, in which a fluid mold material under pressure is supplied by a supply means to a molding space enclosed in a mold and is kept under pressure during solidification of the mold material, wherein a medium surrounding the mold during the molding is pressurized to at least the same magnitude as the pressure of the mold material, the medium acting upon the mold from all directions to isostatically balance the forces acting upon the mold by the mold material and the medium.

2. A method according to claim 1, wherein the pressure in the molding space of the mold is registered and the pressure of the medium is adjusted in dependence of the pressure in the molding space of the mold.

3. A method according to claim 1 or 2, wherein the mold is formed by a plurality of separable parts and the medium is brought to a pressure that is greater than the pressure of the mold material in the molding space.

4. A method according to claim 1, wherein a molten plastic material is injected under pressure into the molding space of the mold.

5. A device for molding objects, comprising a mold having a molding space adapted to be filled by a mold material, the mold material supplied by a supply means being adapted to supply the mold material under pressure to the molding space for solidification under pressure, wherein the device further comprises a chamber adapted to receive the mold and a pressure generating means adapted to pressurize a medium to at least the same magnitude as the pressure of the mold material, the medium filling the chamber to isostatically balance the forces acting upon the mold by the mold material.

6. A device according to claim 5, wherein a monitoring means is adapted to register the pressure in the molding space of the mold during the molding and control the pressure generating means to adjust the pressure of the medium in the chamber depending upon the pressure in the molding space of the mold.

7. A device according to claim 5 or 6, wherein the mold is formed by a plurality of separable parts and the pressure generating means is adapted to pressurize the medium in the chamber to a greater pressure than that of the mold material in the molding space during the molding, such that the greater pressure of the medium prevents the separation of the mold parts from each other during the molding process.

8. A device according to claim 5, wherein a molten plastic material is injected under pressure into the molding space.

9. A device according to claim 8, wherein the supply means is adapted to supply polyethylene in its molten state to the molding space under pressure.

10. A device according claim 5, wherein the supply means is adapted to supply the mold material under a pressure exceeding 2,000 bars.

11. A device according to claim 5, wherein the supply means is adapted to supply the mold material under a pressure exceeding 5,000 bars.

12. A device according to claim 5, wherein the supply means is adapted to feed a metal or a metal alloy in its molten state to the molding space of the mold under pressure.

13. A device according to claim 12, wherein the supply means is adapted to supply aluminum in its molten state under pressure to the molding space.

14. A device according to claim 5, wherein a monitoring means is adapted to regulate the pressure of the medium filling the chamber.

15. A device according to claim 14, wherein the medium is oil.

16. A device according to claim 5, wherein the pressure generating means is adapted to pressurize an elastomer forming a first medium, the first medium locally surrounding the mold within the chamber.

17. A device according to claim 16, wherein the chamber also contains a second medium contacting the first medium and filling the remainder of the chamber, the second medium being in a fluid state.

18. A device according to claim 5, wherein the pressure generating means is adapted to pressurize the chamber by reducing the volume of the chamber such that the medium becomes more compressed.

19. A device according to claim 5, wherein a heating arrangement is adapted to control the temperature of the mold material supplied to the molding space of the mold under pressure.

20. A device according to claim 19, wherein the heating arrangement has a heating means for directly or indirectly transferring heat to the mold to prolong the time necessary for the mold material in molding space to solidify.

* * * * *